(12) United States Patent
Cross, Jr. et al.

(10) Patent No.: US 6,249,949 B1
(45) Date of Patent: Jun. 26, 2001

(54) APPARATUS AND METHOD FOR REMOVING BEAD WIRES FROM VEHICLE TIRES

(76) Inventors: Wiley E. Cross, Jr., P.O. Box 464, Ordinary, VA (US) 23131-0464; F. Linwood Hendricks, 2420 Cedar Crest Rd., Richmond, VA (US) 23235-2868

( * ) Notice: Subject to any disclaimer, the term of this patent is extended or adjusted under 35 U.S.C. 154(b) by 0 days.

(21) Appl. No.: 09/247,077

(22) Filed: Feb. 9, 1999

Related U.S. Application Data

(60) Provisional application No. 60/074,156, filed on Feb. 9, 1998.

(51) Int. Cl.$^7$ ....................................... B23P 19/00
(52) U.S. Cl. ....................... 29/426.4; 29/403.3; 29/426.5; 29/822
(58) Field of Search .................................. 29/426.4, 244, 29/700, 283, 822, 403.3, 426.5, 802

(56) References Cited

U.S. PATENT DOCUMENTS

| | | | |
|---|---|---|---|
| 3,838,492 | * | 10/1974 | Uemura . |
| 4,355,556 | * | 10/1982 | Ulsky . |
| 4,873,759 | * | 10/1989 | Burch ..................................... 29/700 |
| 5,319,834 | * | 6/1994 | Voigts ................................... 29/426.4 |
| 5,395,061 | * | 3/1995 | Merklinger . |
| 5,675,882 | * | 10/1997 | Hunt et al. .......................... 29/426.3 |
| 5,783,035 | * | 7/1998 | Pederson .......................... 29/426.4 X |

* cited by examiner

Primary Examiner—I Cuda Rosenbaum
Assistant Examiner—Eric Compton

(57) ABSTRACT

An automated apparatus and method for removing the bead wires from discarded tires prior to further processing of the rubber of the tire casing employs an intermittently movable infeed conveyor that brings each tire to a position where it drops into a chute leading to a debeading chamber. In a particular embodiment, the tire comes to rest on pivoted gates in the chute, which open to drop a tire into the debeading chamber. In the debeading chamber, the tire rests upright on a spring-loaded platform that forms the floor of the debeading chamber. Side plates with cruciform die openings form sidewalls of the debeading chamber that confront the sidewalls of the tire. The tire is positioned so that the openings in the tire sidewalls are generally aligned with the die openings. Hooks of movable bead pullers extend through the vertical slots of the die openings and through the central openings of the tire sidewalls to positions where their downwardly open hooked ends overlap between the tire sidewalls. The platform then moves up, raising the tire so that the tire beads press against the hooks. The hooks then retract through the die openings; during this movement, the hooks grip the bead wires and pull the tire beads away from each other toward the die openings. As the retracting movement of the hooks continues, the bead wires, gripped by the hooks, are pulled through the horizontal slots of the die openings. The rubber encasing the bead wires cannot fit through the horizontal slots of the die openings and is stripped from the bead wires. As the hooks begin retracting, the platform moves downwardly to accommodate the distortion of the tire. The travel of the hooks is sufficient to pull an entire loop of bead wires through the die openings to a position outboard of the debeading chamber, where the bead wires drop from the hooks. When the retracting movement of the hooks is complete, a discharge member forming a rear wall of the debeading chamber moves forwardly, ejecting the tire casing from the debeading chamber and into to a chute leading to a collection area. Cutters carried on the side edges of the discharge member slide over the side plates and will shear off any stray bead wires extending into the debeading chamber through the die openings.

35 Claims, 5 Drawing Sheets

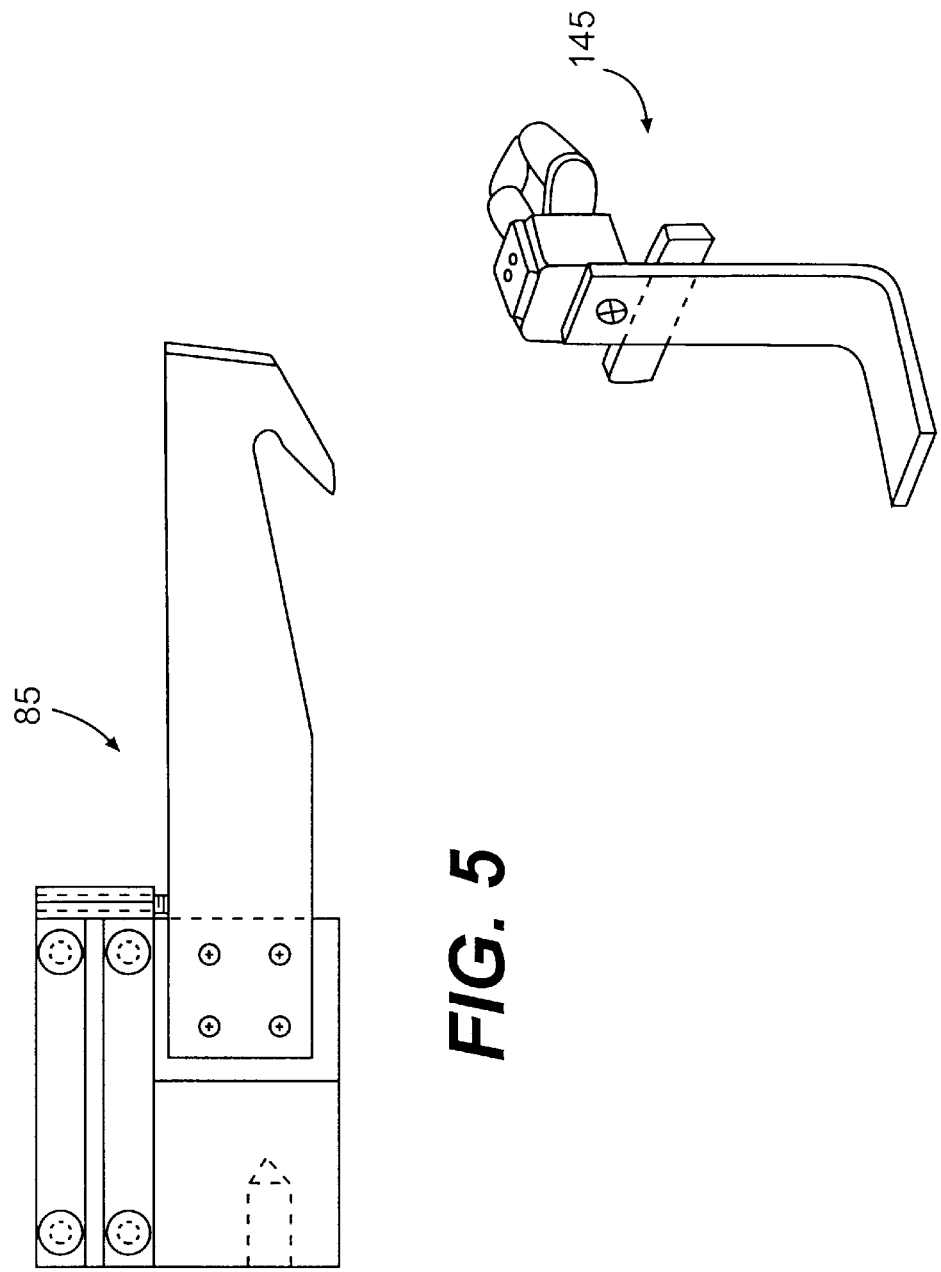

APPARATUS AND METHOD FOR REMOVING BEAD WIRES FROM VEHICLE TIRES

This application claims priority of provisional application Ser. No. 60/074,156 filed on Feb. 9, 1998, the entire contents of which are hereby incorporated by reference.

BACKGROUND OF THE INVENTION

The present invention relates to an apparatus, and a method, for removing bead wire from discarded vehicle tires. More particularly, the invention relates to an automatic debeading apparatus and an automated debeading method, requiring a minimum of manual intervention, in which the tires are fed one-at-a time to a debeading chamber, the bead wire is removed from the tires, and the debeaded tire carcasses are then discharged from the debeading chamber.

Each year, approximately thirty to forty million new passenger and light truck tires are manufactured in the United States alone. In past years it has not been economically feasible to recycle the discarded tires, due primarily to the cost of handling the tires and the absence of a market for the recycled tire material. As a consequence, many of these tires have been relegated to landfills or have been piled on both public and private land. The tire piles present a health problem, as they breed rodents and other vermin. The tire piles are also unsightly and are frequently the site of fires that are very difficult to extinguish. Recently, many states have passed laws prohibiting tire piles as well as the discarding of tires anywhere other than in authorized depositories. Most landfills do not accept tires unless they have been split around the tread center, because unsplit tires occupy too much volume and tend to float to the surface.

A vehicle tire includes a rubber casing that seals against the wheel rim and is generally reinforced with a non-metallic cord. For most tires, onto this casing is placed a wide band of two layers of closely spaced fine wire which underlies a thick outer layer of tread rubber as a wearing surface. In order to prevent the casing from pulling free of the wheel rim, bead wire consisting of several relatively heavy gauge wires is vulcanized into the tire casing on each side where it mounts to the rim. In most cases, the bead wire is made of four wires wound on a mandrel to make two to three layers prior to insertion in the tire. One manufacturer includes one additional wire of even heavier gauge in with the winding. A good tire is an item which is virtually indestructible not readily biodegradable.

There are several known uses for recycled scrap tires. Rubber bums clean at the temperatures found in modem furnaces with a heat value slightly higher than that of coal. For this reason, whole tires, along with iron, are added to cement kilns. However, this use of scrap tires is limited. Some grate-type furnaces can also bum whole tires but the heavy bead wire in the tires frequently causes problems in the grates.

Shredded tires in pieces about two inches square find a greater use as fuel but the bead wire again causes problems in the furnace grates. Additionally, the heavy bead wire must be sheared approximately fifty times by the shredder. Fine wire in the tread belts is sometimes not acceptable to be burned, so the material from the shredder must be magnetically separated before burning. At this stage, bead wire removal provides up to approximately forty percent more wire-free rubber.

Shredded tires are also fed through reduction mills where the rubber is mechanically reduced in size and wire is worked clear. By magnetic means, the free wire is removed from the rubber. After several stages of milling and separation the wire-free rubber is screened into various meshes. This is known as crumb rubber. Larger pieces are used as a covering for playgrounds or processed into other uses such as for a running track.

Finer meshes find a variety of uses in the manufacturer of articles such as hoses, belts, buckets and building blocks. As an additive to asphalt in road surfaces to extend their life, this rubber has a very large potential usage.

Whether tires are used as fuel or to generate crumb, the removal of the bead wire has the advantage of greatly expanding blade life in the shredder and reduction mills. When the rubber is used for fuel, grate life and maintenance are extended and the high-grade steel in the bead wire is available to be sold for additional revenue.

An apparatus for debeading tires, disclosed by Uemura in U.S. Pat. No. 3,838,492, employs a hooked bead puller that is movable through a cruciform die opening and through the bead opening of a tire so as to engage the bead of the tire. The slots in the die opening will accommodate the hook of the bead puller and the bead wires grasped by the hook. The rubber encasing the bead wire cannot pass through the die opening and is stripped away as the hook is retracted through the die opening. Debeading operations carried out using the Uemura apparatus are considerably labor intensive and time consuming. Tires to be debeaded are placed in the apparatus manually one-at-a-time. A debeading operation can remove the wires from just one of the tire beads at a time. Removal of the wires from the other bead requires positioning the tire with the other sidewall confronting the die opening and repeating the just-described operation of drawing the bead wires through the die opening. Because the force required to remove the wires from a tire bead is considerable, a firm engagement of the hook with the tire bead, to ensure grasping of the wires by the hook, is essential. In the Uemura apparatus, the weight of the tire presses the bead against the extended hook. The pressure between the hook and the tire bead produced by the weight of the tire alone does not always result in a secure grasp of the wires by the hook. Also, the removed bead wires remain on the upwardly open hook and must be removed before another debeading operation can take place.

OBJECTS OF THE INVENTION

It is an object of the present invention to provide an apparatus and a method for removing bead wire from vehicle tires that may be practiced automatically at high production rates.

It is another object of the present invention to provide an apparatus and a method for removing bead wire from vehicle tires that operates more reliably than known apparatuses and methods.

It is yet another object of the present invention to provide an apparatus and a method for reliably removing bead wire from vehicle tires of different sizes.

The foregoing and other objects of the present invention are achieved by an apparatus for removing embedded bead wire from a vehicle tire having a circumferential tread joining tire sidewalls and beads incorporating the bead wire and defining a circular bead opening in each tire sidewall, the apparatus comprising: a debeading chamber including a die member with a die opening extending therethrough; a hook including a hook mounted for movement through the die opening into and out of the debeading chamber; first means for moving the hook through the die opening and through the bead opening of a tire located in the debeading chamber between an extended position in which the hook is disposed between the tire sidewalls and a retracted position in which the hook is disposed outside of the debeading chamber, whereby as the hook moves toward the retracted position, bead wire engaged by the hook is drawn through the die opening, and tire material encasing the bead wire is stripped from the bead wire; and second means for applying a force to a tire in the debeading chamber so as to press the tire bead against the hook to thereby ensure that the hook engages the bead wire as the hook moves toward the retracted position.

The objects of the present invention are also achieved by an apparatus for removing embedded bead wire from a vehicle tire having a circumferential tread joining tire sidewalls and beads incorporating the bead wire and defining a circular bead opening in each tire sidewall, the apparatus comprising: a debeading chamber including a die member with a die opening extending therethrough; a hook mounted for movement through the die opening into and out of the debeading chamber; first means for moving the hook through the die opening and through the bead opening of a tire located in the debeading chamber between an extended position in which the hook is disposed between the tire sidewalls and a retracted position in which the hook is disposed outside of the debeading chamber, whereby as the hook moves toward the retracted position, bead wire engaged by the hook is drawn through the die opening, and tire material encasing the bead wire is stripped from the bead wire; and second means, including a motor-driven conveyor, for introducing tires one-at-a-time into the debeading chamber.

The objects of the present invention are also achieved by an apparatus for removing embedded bead wire from a vehicle tire having a circumferential tread joining tire sidewalls and beads incorporating the bead wire and defining a circular bead opening in each tire sidewall, the apparatus comprising: a debeading chamber including a pair of transversely spaced dies, each of the dies having a die opening extending therethrough; a pair of hooks mounted for movement toward and away from each other through one of the die openings into and out of the debeading chamber; first means for moving the hooks through the die openings and through the bead openings of a tire located in the debeading chamber between an extended position in which each hook is disposed between the tire sidewalls and a retracted position in which each hook is disposed outside of the debeading chamber, whereby as the hooks move toward the retracted position, bead wire engaged by each hook is drawn through a die opening, and tire material encasing the bead wire is stripped from the bead wire.

The objects of the present invention are also achieved by a method for removing embedded bead wire from a vehicle tire having a circumferential tread joining tire sidewalls and beads incorporating the bead wire and defining a circular bead opening in each tire sidewall, the method comprising the steps of: a) introducing a tire into a debeading chamber with the opening in the tire sidewall confronting a die opening in a die provided in the debeading chamber; b) moving a hook through the die opening into the debeading chamber and through the opening in the tire sidewall to an extended position wherein the hook is disposed between the tire sidewalls; c) applying a force to press the tire bead against the hook to thereby promote engagement of the hook with the bead wire as the hook moves from the extended position toward a retracted position out of the debeading chamber; and d) moving the hook through the die opening toward the retracted position to effect engagement of the hook with the bead wire and subsequent movement of the hook and the bead wire through the die opening while stripping away tire material encasing the bead wire.

The objects of the present invention are also achieved by a method for removing embedded bead wire from a vehicle tire having a circumferential tread joining tire sidewalls and beads incorporating the bead wire and defining a circular bead opening in each tire sidewall, the method comprising the steps of: a) introducing a tire into a debeading chamber with the openings in the tire sidewalls confronting die openings in a pair of transversely spaced dies provided in the debeading chamber; b) moving a hook through each die opening into the debeading chamber, through each opening in the tire sidewall and toward the other hook to an extended position in the debeading chamber wherein the hooks are disposed between the tire sidewalls; and c) moving the hooks through the die openings and away from each other to a retracted position out of the debeading chamber to effect engagement of the hooks with the tire beads and subsequent movement of the hooks and the bead wire through the die openings while stripping away tire material encasing the bead wire.

The detailed description of preferred embodiments which follows, to be read in conjunction with the accompanying drawings, will afford a comprehensive understanding of the present invention. However, preferred embodiments of the invention should be regarded as illustrative only, since various modifications within the spirit and scope of the invention may become apparent to persons of ordinary skill in the art who have had the benefit of this disclosure.

BRIEF DESCRIPTION OF THE DRAWINGS

FIG. 5 is an illustration of details of a bead puller hook; and

FIG. 6 is an illustration of details of the hangers used to support the tires on the endless chain feed conveyor.

DETAILED DESCRIPTION OF PREFERRED EMBODIMENTS

To the extent needed, the disclosures in the following U.S. patents are hereby incorporated by reference into this disclosure: U.S. Pat. No. 3,838,492 (Uemura), U.S. Pat. No. 4,873,759 (Burch), U.S. Pat. No. 5,319,834 (Voigts) and U.S. Pat. No. 5,675,882 (Hunt et al.).

As used in this patent application, the term "bead wire" is intended to signify any number of wires embedded in the tire bead and wound one or more times about the bead opening so as to form a loop of one or more courses encircling the bead opening.

Figure 1:
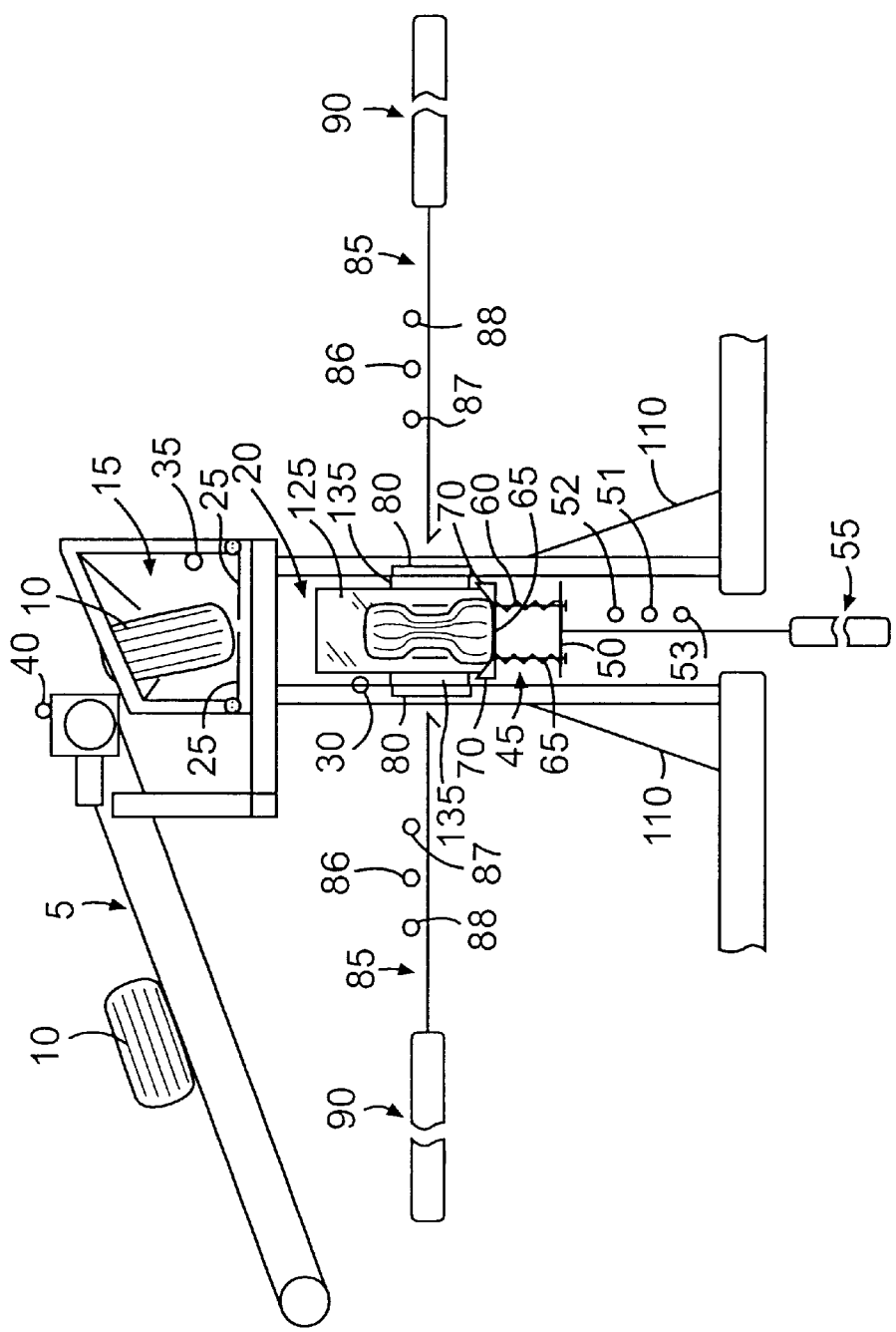
FIG. 1 is a schematic illustration, in front elevation, of an embodiment the debeading apparatus of the present invention, showing the position of the hooks and the elevator just after the introduction of a tire into the debeading chamber.
Figure 2:
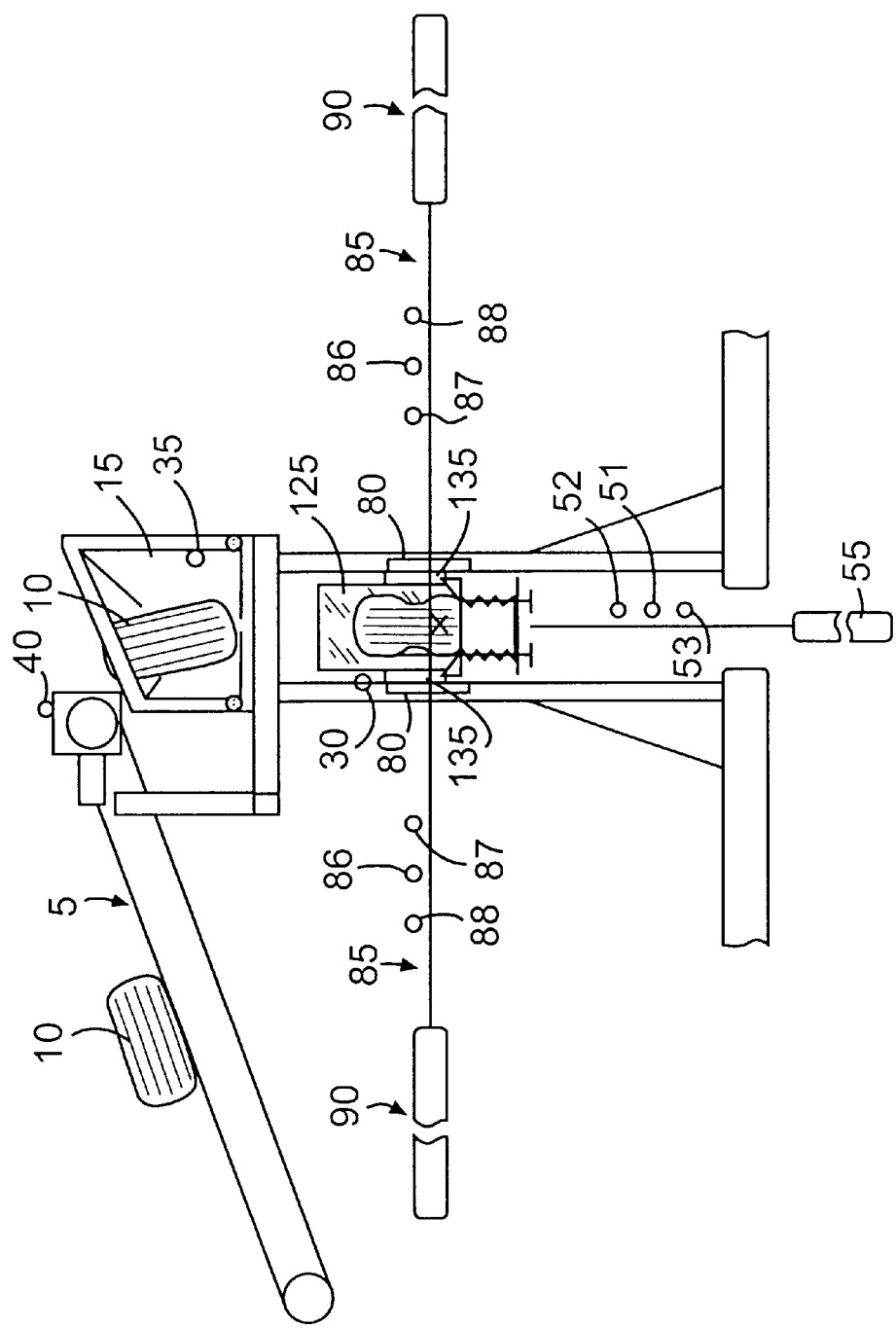
FIG. 2 is a schematic illustration like FIG. 1, but showing the hooks extended into the debeading chamber and showing the elevator pressing the tire beads upwardly against the undersides of the hooks.
Figure 3:
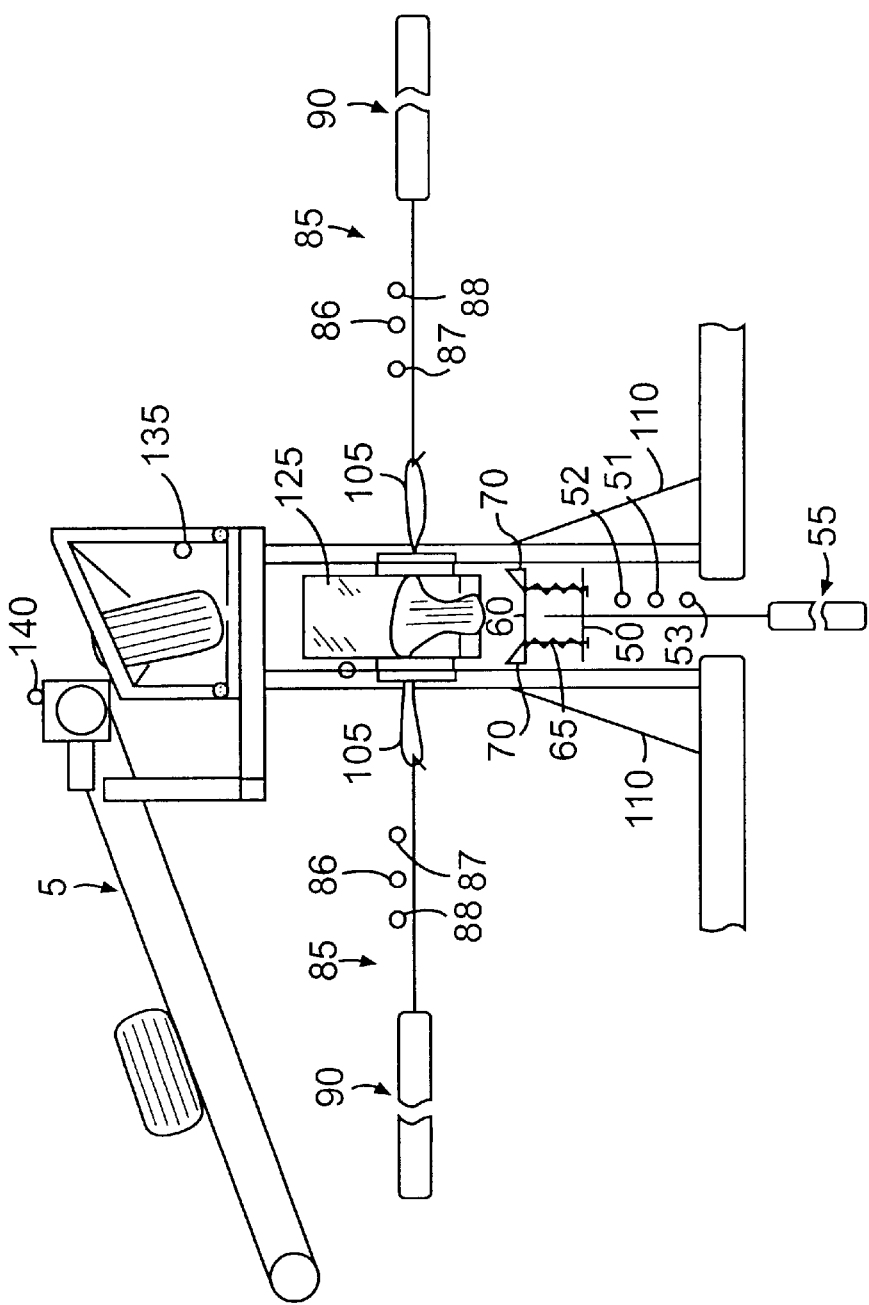
FIG. 3 is a schematic illustration like FIG. 1, but showing the hooks in retracted positions while grasping the tire bead wires and showing the elevator lowered to accommodate distortion of the tire in the debeading chamber.

As shown in FIGS. 1–3, a debeading apparatus constructed according to the present invention includes an endless belt conveyor 5 on which tires 10 to be debeaded are transported to a position above a chute 15 leading to the debeading chamber 20. During the transport, the tires rest on their sides on the conveyor belt, which may include cleats to preclude slippage of wet tires down the conveyor incline. As illustrated, a tire received from the conveyor is supported on pivoted gates 25 that extend across the chute and block the entrance to the debeading chamber below. A sensor 30 , such as a photosensor looking into the debeading chamber, determines whether a tire is in the debeading chamber. Another sensor 35 determines whether a tire is supported on the pivoted gates. Another sensor 40 determines whether a tire on the conveyor is at the top of the conveyor run. The sequence of the operations performed by the debeading apparatus is governed by a programmable controller incorporating a microprocessor. The controller, receiving a positive report from sensor 35 and negative report from sensor 30, issues a control signal to a device, such as a hydraulic cylinder (not shown) coupled to the gates to effect pivoting of the gates downwardly into the chute and allow the tire supported by the gates to fall into the debeading chamber; the gates will then return to positions extending across the chute. The controller, upon receiving a positive report from sensor 35 will also stop the operation of the motor driving the conveyor when a tire is determined to be at the top of the conveyor run. Upon receipt of a negative report from sensor 35, the controller will operate the conveyor motor to deposit a tire into the chute and onto the extended gates.

Figure 4:
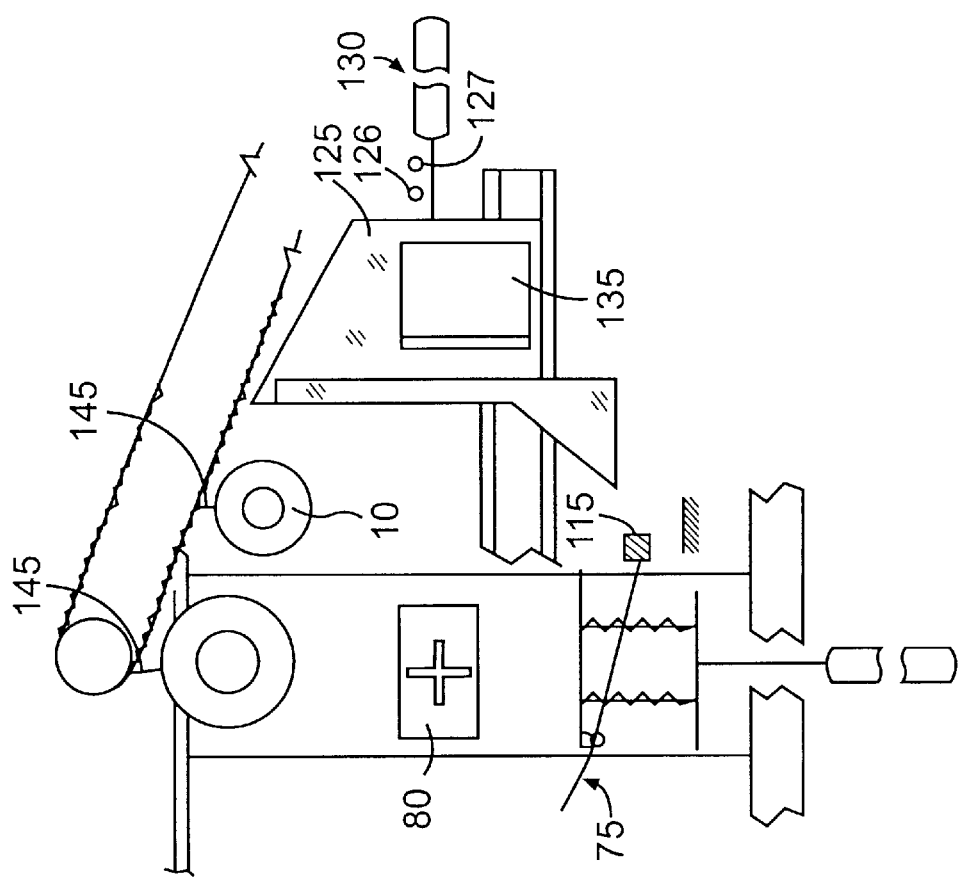
FIG. 4 is a schematic illustration, in side elevation, showing the cruciform die in the debeading chamber, the discharge member and the pivoted flap on the elevator and also showing an endless chain feed conveyor for the tires.

When a tire falls into the debeading chamber, it comes to rest on a support assembly, or elevator, 45. The elevator includes a support frame 50 directly coupled to an operating device such as hydraulic cylinder 55. Another component of the elevator, platform 60, provides direct support for the tire. The platform is resiliently supported on the support frame, as by compression springs 65 surrounding guide rods extending from the bottom of the platform and passing through openings in the support frame. Wedge formations 70 at the sides of the platform encourage side-to-side centering of the tire in the debeading chamber. A flap 75 pivoted to the front edge of the platform assumes an upwardly inclined position, as shown in FIG. 4, when the elevator is in one of its upper positions. The flap thus forms a barrier that keeps the tire from rolling forwardly off the platform and out of the debeading chamber.

The debeading apparatus includes strong frame members that support debeading dies 80 at the sides of the debeading chamber. As best shown in FIG. 4, the dies include cruciform openings that accommodate movable bead pullers and the bead wire removed from the tire, as will be described. As illustrated in FIG. 1, just after the introduction of a tire into the debeading chamber, the elevator is disposed in an intermediate position that locates a tire with its sidewall openings confronting and generally aligned with the cruciform openings in the dies 80. A sensor, such as limit switch 51 detects this position of the elevator. The frame members of the debeading apparatus also support a bead puller 85 at each side of the debeading chamber. Each of the bead pullers includes a hook that is aligned with the vertical slot of the cruciform opening in one of the dies. The hooks are movable through the cruciform die openings into and out of the debeading chamber in response to forces applied by devices such as hydraulic cylinders 90 that are operated by the controller. As illustrated in FIG. 1, the hooked ends of the bead pullers are positioned in an intermediate "ready" position just outside of the debeading chamber. This position of the hooks is detected by sensors 86, one for each of the bead pullers.

When sensor 30 determines that a tire is positioned in the debeading chamber, a signal from the controller applied to the cylinders 90 extends the hooks through the dies, into the debeading chamber and through the sidewall openings of the tires. As illustrated in FIG. 2, when the hooks are fully extended, they are disposed alongside each other between the tire sidewalls. (The hooks and the vertical slots of the openings in the dies are slightly offset, from front to rear, to accommodate movement of the hooks past each other.) A sensor, such as limit switch 87 recognizes the fully extended position of each bead puller and provides a confirmation signal to the controller. In response to this signal, the controller operates cylinder 55 to raise the elevator and thereby press the lower regions of the tire beads against the undersides of the hooks. Because the sidewall height of tires to be debeaded varies, the force applied to the hooks by the beads of a tire with a tall sidewall can be appreciable. The springs 65 between the elevator platform and support frame will yield as needed to prevent the force from becoming excessive and will thereby facilitate the debeading of tires that vary considerably in size. A sensor, such as limit switch 52, provides a signal to the controller indicating that the elevator has attained its upper position.

The controller now operates cylinders 90 to retract the bead pullers. As the retracting movement of the hooks begins, The elevator shifts to its lowest position, and the hooks engage and penetrate the beads and grasp the embedded bead wire. As the hooks continue their retracting movement out of the debeading chamber, the bead wire at each side of the tire is drawn through the horizontal slot of the cruciform opening in the die. The horizontal slot is wide enough to accommodate, the bead wire but is not wide enough to accommodate the rubber tire material encasing the bead wire. As a consequence, the rubber encasing the bead wire is stripped away as the bead wire is drawn through the die out of the debeading chamber. When the hooks reach the limit of their retracting movement, as detected by sensors 88, they immediately begin extending and stop at the intermediate position detected by sensors 86.

As illustrated in FIG. 3, the hook of each bead puller, grasping a loop of bead wire 105, is located near the limit of its retracted position. As the retracting movement continues, the bead wire will be pulled through the die opening completely out of the debeading chamber and will then fall from the downwardly open hook onto a discharge guide 110. As the bead wire is removed, the tire undergoes a marked distortion, as depicted in FIG. 3. The platform, in its lowest position, is out of the way of the tire as it becomes distorted and is also out of the way of a pusher member, which expels a debeaded tire carcass from the debeading chamber, as will be described.

When the elevator is at its lowest position, which is somewhat below the position illustrated in FIG. 4, the weight 115, which biases the front edge of flap 75 upwardly, engages an abutment, which causes the front edge of the flap to pivot downward into general alignment with the elevator platform. A sensor, such as limit switch 53, detects the lowest position of the elevator. A pusher member 125 at the rear of the debeading chamber is mounted on guides for movement into and out of the debeading chamber. Upon receipt of a signal from sensor 53, the controller operates a device such as hydraulic cylinder 130 to extend the pusher member forwardly into the debeading chamber to push the debeaded tire carcass off the elevator and out of the debeading chamber to a collection area. Cutters 135 carried at each side of the pusher member move closely past the debeading dies and will sever any bead wires extending through the die into the debeading chamber after the bead pullers have completely retracted. Sensors, such as limit switches 126, 127, detect the fully extended and fully retracted positions of the pusher member.

After discharge of the tire carcass from the debeading chamber, the pusher member retracts. Upon receipt of a signal from sensor 127, which detects the full retraction of the pusher member, the controller issues a signal to shift the elevator to its intermediate position, and another debeading operation can occur.

The embodiment of the debeading apparatus shown in FIG. 4 employs an endless chain conveyor 140 with pivoted hooks 145, shown in FIG. 6, from which tires are suspended as they travel upwardly to the entrance to the debeading chamber. At the top of the conveyor run, a motor-operated deflector is provided to dislodge the tire from the hook. With this arrangement, the pivoted gates employed in the embodiment of FIGS. 1–3 are not required, and the tires fall from the conveyor directly into the debeading chamber.

Variations of the invention may become apparent from the foregoing disclosure. All such variations and modifications which would be obvious to persons of ordinary skill in the art should be regarded as falling within the scope of invention as defined in the following claims.

What is claimed is:

1. An apparatus for removing embedded bead wire from a vehicle tire having a circumferential tread joining tire sidewalls and beads incorporating the bead wire and defining a circular bead opening in each tire sidewall, the apparatus comprising:

a debeading chamber including a die member with a die opening extending therethrough;

a hook mounted for movement through the die opening into and out of the debeading chamber;

first means for moving the hook through the die opening and through the bead opening of a tire located in the debeading chamber between an extended position in which the hook is disposed between the tire sidewalls and a retracted position in which the hook is disposed outside of the debeading chamber, whereby as the hook moves toward the retracted position, bead wire engaged by the hook is drawn through the die opening, and tire material encasing the bead wire is stripped from the bead wire; and second means for applying a force to a tire in the debeading chamber so as to press the tire bead against the hook to thereby ensure that the hook engages the bead wire as the hook moves toward the retracted position.

2. The apparatus as recited in claim 1, wherein the hook is downwardly open, so that bead wire engaged by the hook tends to fall from the hook when the hook is in the retracted position.

3. The apparatus as recited in claim 1, wherein the second means comprises a support assembly that is movable in the debeading chamber.

4. The apparatus as recited in claim 3, wherein the support assembly serves also for positioning a tire in the debeading chamber with a bead opening of the tire aligned with the die opening and the hook.

5. The apparatus as recited in claim 4, and further comprising third means for moving the support assembly (1) in a first direction to press the tire bead against the hook while the hook is in the extended position and (2) in a second direction to accommodate distortion of the tire as the hook moves toward the retracted position.

6. The apparatus as recited in claim 5, wherein the support assembly comprises:

a support frame directly connected to the third means a platform adapted for direct engagement with a tire in the debeading chamber, the platform being movably mounted relative to the support frame; and resilient means disposed between the support frame and the platform for permitting yielding of the platform in the second direction in response to a force applied by a tire in the debeading chamber.

7. The apparatus as recited in claim 6, wherein the platform comprises a main portion and a flap pivotally mounted to an edge of the main portion and movable between a first position in general alignment with the main portion and a second position that is inclined relative to the main portion.

8. The apparatus as recited in claim 1, and further comprising feed means for introducing tires one-at-a-time into the debeading chamber.

9. The apparatus as recited in claim 8, wherein the feed means comprises an endless conveyor.

10. The apparatus as recited in claim 9, wherein the endless conveyor supports the tires on a sidewall thereof as the tires move toward the debeading chamber.

11. The apparatus as recited in claim 9, wherein the endless conveyor includes serially arranged hooks that support the tires as the tires move toward the debeading chamber.

12. The apparatus as recited in claim 1, and further comprising discharge means for expelling from the debeading chamber the carcass of a tire from which the bead wire has been removed.

13. The apparatus as recited in claim 12, wherein the discharge means comprises a pusher member that is movable in the debeading chamber.

14. The apparatus as recited in claim 13, wherein the pusher member serves also for positioning a tire in the debeading chamber with a bead opening of the tire generally aligned with the die opening and the hook.

15. The apparatus as recited in claim 13, wherein the pusher member carries a cutter that passes over the die opening upon movement of the pusher member to expel a tire carcass, so as to sever any bead wire extending through the die opening into the debeading chamber after the hook has moved to the retracted position.

16. An apparatus for removing embedded bead wire from a vehicle tire having a circumferential tread joining tire sidewalls and beads incorporating the bead wire and defining a circular bead opening in each tire sidewall, the apparatus comprising:

a debeading chamber including a pair of transversely spaced dies, each of the dies having a die opening extending therethrough;

a pair of hooks mounted for movement toward and away from each other through the die openings into and out of the debeading chamber;

first means for moving the hooks through the die openings and through the bead openings of a tire located in the debeading chamber between an extended position in which each hook is disposed between the tire sidewalls and a retracted position in which each hook is disposed outside of the debeading chamber, whereby as the hooks move toward the retracted position, bead wire engaged by each hook is drawn through a die opening, and tire material encasing the bead wire is stripped from the bead wire; and second means for applying a force to a tire in the debeading chamber so as to press the tire beads against the hooks while the hooks are in the extended position to thereby ensure that each hook engages the bead wire as the hooks move through the die openings to the retracted position.

17. The apparatus as recited in claim 16, wherein the hooks are downwardly open, so that bead wire engaged by each hook tends to fall from the hook when the hooks are in the retracted position.

18. The apparatus as recited in claim 16, wherein the second means comprises a support assembly that is movable in the debeading chamber.

19. The apparatus as recited in claim 16, and further comprising feed means, including a motor-driven conveyor, for introducing tires one-at-a-time into the debeading chamber.

20. The apparatus as recited in claim 19, wherein the conveyor comprises an endless conveyor that supports the tires on a sidewall thereof as the tires move toward the debeading chamber.

21. The apparatus as recited in claim 19, wherein the conveyor comprises an endless conveyor including serially arranged hooks that support the tires as the tires move toward the debeading chamber.

22. The apparatus as recited in claim 16, and further comprising discharge means for expelling from the debeading chamber the carcass of a tire from which the bead wire has been removed.

23. The apparatus as recited in claim 22, wherein the discharge means comprises a pusher member that is movable in the debeading chamber between the dies.

24. The apparatus as recited in claim 23, wherein the pusher member carries cutters that pass over the die openings upon movement of the pusher member to expel a tire carcass, so as to sever any bead wire extending through the die openings into the debeading chamber after the hooks have moved to the retracted position.

25. A method for removing embedded bead wire from a vehicle tire having a circumferential tread joining tire sidewalls and beads incorporating the bead wire and defining a circular bead opening in each tire sidewall, the method comprising the steps of:
   a) introducing a tire into a debeading chamber with the opening in the tire sidewall confronting a die opening in a die provided in the debeading chamber;
   b) moving a hook through the die opening into the debeading chamber and through the opening in the tire sidewall to an extended position wherein the hook is disposed between the tire sidewalls;
   c) applying a force to a tire in the debeading chamber to press the tire bead against the hook to thereby promote engagement of the hook with the bead wire as the hook moves from the extended position toward a retracted position out of the debeading chamber; and
   d) moving the hook through the die opening toward the retracted position to effect engagement of the hook with the bead wire and subsequent movement of the hook and the bead wire through the die opening while stripping away tire material encasing the bead wire.

26. The method as recited in claim 25, wherein the hook is oriented so as to be downwardly open, so that bead wire engaged by the hook tends to fall from the hook when the hook is in the retracted position.

27. The method as recited in claim 25, and further comprising the following step, which occurs as step d) begins:
   d') relieving the force pressing the tire bead against the hook to thereby accommodate distortion of the tire as the hook moves toward the retracted position.

28. The method as recited in claim 25, and further comprising the step of resiliently supporting the tire in the debeading chamber.

29. The method as recited in claim 25, and further comprising the step e) of expelling from the debeading chamber the tire carcass remaining after the bead wire has been removed.

30. The method as recited in claim 29, wherein step e) includes the substep of passing a cutter over the die opening to sever any bead wire extending through the die opening into the debeading chamber after the hook has moved to the retracted position.

31. A method for removing embedded bead wire from a vehicle tire having a circumferential tread joining tire sidewalls and beads incorporating the bead wire and defining a circular bead opening in each tire sidewall, the method comprising the steps of:
   a) introducing a tire into a debeading chamber with the openings in the tire sidewalls confronting die openings in a pair of transversely spaced dies provided in the debeading chamber;
   b) moving a hook through each die opening into the debeading chamber, through each opening in the tire sidewall and toward the other hook to an extended position in the debeading chamber wherein the hooks are disposed between the tire sidewalls; (and)
   c) applying a force to press the tire beads against the hooks to thereby promote engagement of the hooks with the bead wire as the hooks move from the extended position toward a retracted position out of the debeading chamber; and
   d) moving the hooks through the die openings and away from each other to the retracted position to effect engagement of the hooks with the tire beads and subsequent movement of the hooks and the bead wire through the die openings while stripping away tire material encasing the bead wire.

32. The method as recited in claim 31, wherein the hooks are oriented so as to be downwardly open, so that bead wire engaged by the hooks tends to fall from the hooks when the hooks are in the retracted position.

33. The method as recited in claim 31, and further comprising the following step, which occurs as step d) begins:
   d') relieving the force pressing the tire bead against the hook to thereby accommodate distortion of the tire as the hook moves toward the retracted position.

34. The method as recited in claim 31, and further comprising the step d) of expelling from the debeading chamber the tire carcass remaining after the bead wire has been removed.

35. The method as recited in claim 34, wherein step d) includes the substep of passing cutters over the die openings to sever any bead wire extending through the die openings into the debeading chamber after the hooks have moved to the retracted position.

* * * * *